US 6,717,516 B2

(12) United States Patent
Bridgelall (10) Patent No.: US 6,717,516 B2
(45) Date of Patent: Apr. 6, 2004

(54) HYBRID BLUETOOTH/RFID BASED REAL TIME LOCATION TRACKING

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 134 days.

(21) Appl. No.: 09/801,537

(22) Filed: Mar. 8, 2001

(65) Prior Publication Data

US 2002/0126013 A1 Sep. 12, 2002

(51) Int. Cl.[7] .............................................. G08B 13/14
(52) U.S. Cl. .......................... 340/572.1; 340/572.4; 340/505; 342/42; 342/44; 342/50; 455/59; 455/62; 455/73; 455/101; 455/106
(58) Field of Search ............................ 340/572.1, 572.4, 340/505, 825.34, 575; 342/42, 44, 50; 455/101, 73, 106, 59, 62

(56) References Cited

U.S. PATENT DOCUMENTS

| 5,051,741 A | * | 9/1991 | Wesby | 340/825.49 |
|---|---|---|---|---|
| 5,382,784 A | * | 1/1995 | Eberhardt | 235/472 |
| 5,455,575 A | * | 10/1995 | Schuermann | 342/42 |
| 5,883,582 A | * | 3/1999 | Bowers et al. | 340/825.54 |
| 5,887,176 A | * | 3/1999 | Griffith et al. | 395/750 |
| 5,952,922 A | * | 9/1999 | Shober | 340/572.4 |
| 5,974,368 A | * | 10/1999 | Schopps et al. | 702/188 |
| 6,078,251 A | * | 6/2000 | Landt et al. | 340/10.41 |
| 6,150,942 A | * | 11/2000 | O'Brien | 340/573.1 |

FOREIGN PATENT DOCUMENTS

| WO | 9965260 | 12/1999 |
|---|---|---|
| WO | 0037958 | 6/2000 |

OTHER PUBLICATIONS

"The Next Generation of Control: Local Positioning" by Jay Werb and Colin Lanzl; EDBACS, the EDP Audit, Control, and Security Newsletter; Feb. 1999, vol. XXVI, No. 8, pp. 1–17.

* cited by examiner

Primary Examiner—Daniel J. Wu
Assistant Examiner—Tai T. Nguyen
(74) Attorney, Agent, or Firm—Baker Botts LLP (57) ABSTRACT

Devices having either wireless data communication capability or RFID tags can be located using dual function fixed devices which are distributed throughout a facility. The devices will identify those units with which they are communicating using a wireless radio data communications protocol and also identify items within the local area using RFID tags on the units.

16 Claims, 5 Drawing Sheets

HYBRID BLUETOOTH/RFID BASED REAL TIME LOCATION TRACKING

BACKGROUND OF THE INVENTION

This invention relates to wireless data communication technology and in particular to data communication technology which facilitates the location of items within an area having wireless data communications.

Figure 1:
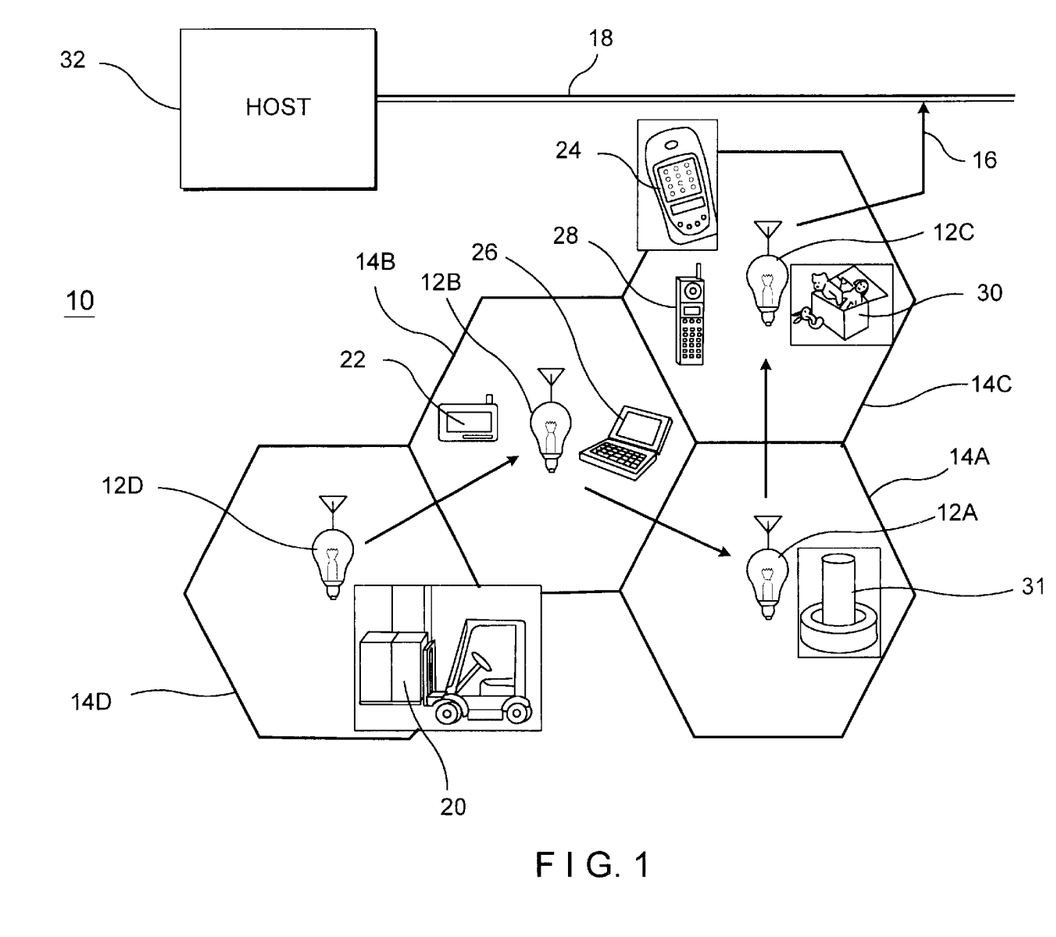
FIG. 1 is a diagram illustrating an area having a plurality of fixed devices according to the present invention.

Currently known wireless data communication systems include the Bluetooth system, the specification for which is available at www.bluetooth.com. The Bluetooth communication specification provides for wireless data communication links between a master device and a plurality of slave devices within a piconet comprising an area within a range of approximately 10 meters from the master device. Adjacent piconets can conduct relay communications between their respective masters and thereby form larger networks called scatternets. Bluetooth masters coordinate the traffic within and between piconets. Masters can be positioned in a cellular manner as illustrated in FIG. 1 to provide wireless communications within an area, such as an industrial, educational, or health care facility. Because Bluetooth slave devices associate with the master units, it is possible to determine the location of a slave unit within a particular piconet of the system by reason of the association, and thereby locate the unit within a range of approximately 10 meters. In connection with operation of a scatternet, the Bluetooth master devices may relay the identity of mobile slave devices that are within their individual piconets to a host processor for purposes of tracking the location of a mobile slave device, or the location of a person carrying a device.

In some cases it is desirable to determine the location of a device which is not a slave unit. One technique for locating devices is to provide such devices with active or passive back scatter RFID tags. An RFID reader can be placed at a selected location and can be used to determine the range from the known location of the RFID reader to an RFID tag on a device within a zone covered by the RFID reader.

It is an object of the present invention to provide an improved method and system for locating objects having either a data communications mobile unit or an RFID tag.

SUMMARY OF THE INVENTION

In accordance with the invention there is provided a method for locating items. A plurality of fixed devices are distributed over an area containing the items. The fixed devices are operated as master units using a first wireless data communications protocol, wherein each of the master units controls slave units within an area corresponding to the location of each of the fixed devices. The operating includes identifying the slave units thereby to locate items corresponding to the slave units within the area corresponding to the location of each fixed device. The fixed devices are further operated as RFID readers to identify and locate items having RFID tags with respect to the fixed device.

In a preferred embodiment of the method, items may be provided with both slave units using the wireless data communications protocol and with RFID tags. The fixed devices may be operable as a master unit and as an RFID reader during alternating time periods. A plurality of the fixed devices are preferably distributed at distances corresponding to twice the range of the devices when operated as RFID readers. The operation to identify and locate items having RFID tags may preferably comprise transmitting RFID reader signals, receiving RFID response signals and determining the range of an RFID device from the fixed device using the response signals. In a particularly preferred embodiment, range may be determined from the phase of the response signals and the phase may be determined at a plurality of frequencies to resolve phase ambiguities. The device may transmit and receive RFID signals on directional antenna beams to additionally determine the direction of an RFID device with respect to a fixed device.

In accordance with the invention there is provided a system for locating items which includes a plurality of fixed devices distributed over an area containing the items and sub-dividing the area into a plurality of cells. Each fixed device corresponds to one of more of the cells. The fixed devices each comprise a transmitter, a receiver and a signal processor. Each fixed device is arranged to operate as master unit using a first wireless data communications protocol to communicate with slave units in the one or more cells corresponding to the fixed device to thereby locate items having the slave devices in the one or more cells. The fixed device is further arranged to operate as an RFID tag reader to identify and locate RFID tags on items in the one or more cells.

In a preferred arrangement the fixed devices are arranged to communicate location data relating to the items having slave units and the items having RFID tags to a host processor.

In accordance with the invention there is provided a device having at least one transmitter and at least one receiver. The device further includes a processor coupled to provide signals for transmission by the transmitter and to process signals received by the receiver. The processor includes a first program for sending and receiving digital data signals using a first wireless data communication protocol and thereby identifying remote units within range for communications therewith. The processor further includes a second program for sending and receiving RFID reading signals to thereby identify RFID tags within range for identification.

In a preferred arrangement, the second program further provides for determining range from the RFID tags to the device. The device may include two transmitters and two receivers for respectively transmitting and receiving wireless data communications signals and RFID reading signals. The two transmitters and two receivers are preferably coupled to the processor by a common baseband signal processor. The processor may be arranged to cause the device to operate using the first and second programs during alternate time intervals. The processor may be further programmed to provide data identifying the remote units within range and data identifying the RFID tags within range to a host processor.

For a better understanding of the present invention, together with other and further objects, reference is made to the following description taken in conjunction with the accompanying drawings, and its scope will be pointed out in the appended claims.

DESCRIPTION OF THE INVENTION

FIG. 1 shows an arrangement for locating items within an area according to one preferred embodiment of the present invention. The system includes multiple fixed devices 12A, 12B, 12C and 12D. The fixed devices 12 in the embodiment shown in FIG. 1 may be incorporated into lighting fixtures distributed over the area. However, as will become apparent, the inclusion of the devices within lighting fixtures is merely for purposes of convenience, since the lighting fixtures have electrical connections associated therewith. Alternately, the fixed devices according to the invention may be modules which are plugged into wall or ceiling electrical outlets distributed over the area within which items are to be located. The devices 12 act as master units using a master slave wireless data communications protocol, such as the Bluetooth protocol, wherein a master device 12 communicates with slave devices within a piconet 14, associated therewith. Accordingly, fixed devices 12A, 12B, 12C, and 12D communicate within slave devices in respective piconets 14A, 14B, 14C and 14D associated therewith. In a preferred arrangement as shown in FIG. 1 the area covered by each piconet 14 is a hexagonal area. The generally hexagonal area results from the fact that devices operating according to the Bluetooth protocol become associated as slave devices with the nearest master unit on the basis of the strength of radio communication signals. It will be recognized by those skilled in the art that the actual shape of each piconet 14 may differ considerably and will be effected by other structures, such as walls and equipment which may be located within the piconet and which may change the respective shapes and overlapping boarders of the piconets. In one arrangement, illustrated in FIG. 1, fixed device 12C is electrically coupled by cable 16 to a host processor 32 operating on a network interconnection 18. Using the scatter net principle of the Bluetooth protocol, or other relay communications master devices 12A, 12B and 12D may communicate signals through fixed device 12C and thereafter to host 32 over network connection 18. It will be recognized that master devices 12 may alternately communicate with each other and with host 32 using other communications techniques, including cables or electrical wiring signaling.

Each of the fixed devices 12 is designed to operate as a master unit, for example using the Bluetooth communications protocol to provide data communications with devices, including fixed and mobile slave devices, located within its respective piconet. For example, fixed device 12B will be in data communications with pager 22 and portable laptop computer 26 located within its piconet 14B. Likewise fixed device 12C will be in wireless data communications, acting as a master unit and operating with slave units comprising personal digital assistant 24 and cell telephone 28 located within its piconet 14C. In a similar manner fixed device 12D will undertake to act as a master with respect to data communications with a slave unit 20 consisting of test equipment located within piconet 14D.

As an additional feature, the fixed devices 12, according to a preferred embodiment of the present invention, additionally provides for sending and receiving RFID reader signals to identify devices located within their respective piconets which have RFID tags located thereon. Accordingly, fixed device 12C can read an RFID tag provided on goods 30 located in piconet 14C. Likewise fixed device 12A can read an RFID tag located on device 31 within piconet 14A and fixed device 12D can read an RFID device tag located on device 20 within piconet 14D.

Because the Bluetooth devices have relatively short range of 10 meters or less, they can be used for location tracking purposes. The location of a mobile slave device, such as a pager, cellular telephone or laptop computer which communicates using the Bluetooth protocol can be tracked to within a relatively small piconet cell 14 by determining which of the fixed devices 12 the mobile slave device has become associated with. The association information can be relayed by each fixed device 12 to the host processor 32 using the scatternet principle, wherein the fixed devices 12 communicate with each other forming a larger local area network. Accordingly, not only can a device be located with fairly close resolution of approximately 30 feet, but the person using or carrying the device can likewise be located within a facility. Reducing the cell size can increase or improve resolution within which a device can be located. The host processor will associate the unique identification of each master device with a physical location within the building. The Bluetooth masters communicate with each other and with host by their natural RF link or alternately through a dedicated cable system or the electrical wiring of the building.

Figure 2:
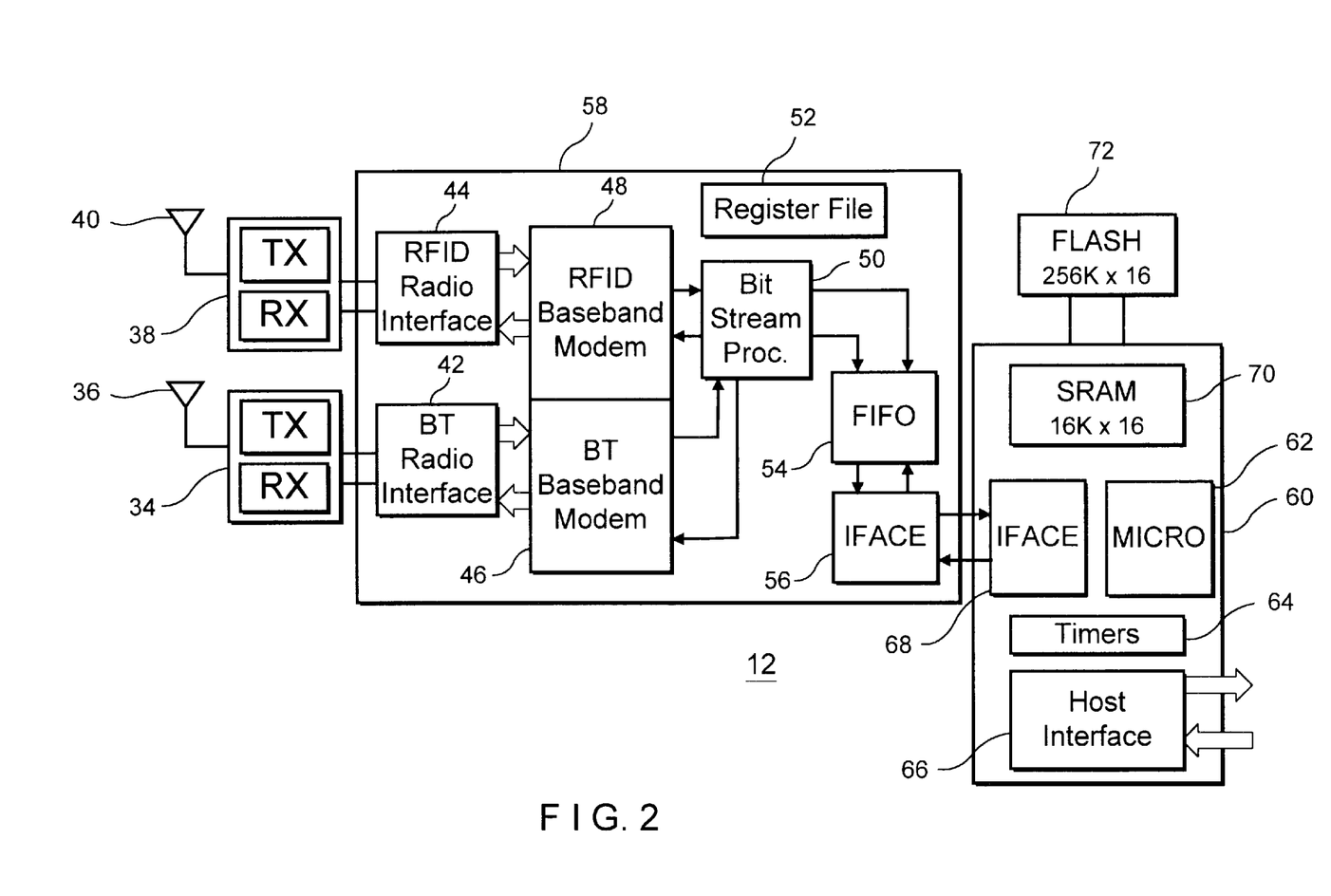
FIG. 2 is a block diagram showing one embodiment of a fixed device in accordance with the present invention.

Higher resolution location tracking capability can also be incorporated into fixed device 12 by adding a back scatter RFID reading capability into the fixed devices 12. Location of back scatter RFID tags using an RFID reader can be achieved by determining the range of the RFID tag from a fixed device 12 having an RFID tag reader. A hybrid Bluetooth and back scatter RFID tag reader device 12 can be designed, as shown in FIG. 2, which provides both Bluetooth data communications and RFID tag reading to determine the location of slave devices operating under the Bluetooth protocol, and also to determine the location of items having RFID tags. The Bluetooth cell size can be adjusted to be equal to that of the RFID passive tag reading capability, usually 12–15 feet and anticipated to exceed 20 feet in the future using advanced technologies.

In one example a pallet load of goods 30 may be tagged with an active or passive RFID tag. The goods can be located with higher range resolution (for example about 1 ft) using the shorter range back scatter RFID tag reader which is integrated into the Bluetooth fixed devices 12 of the piconet. Higher resolution tracking or tracking within a piconet can be accomplished simply by adding an RFID tag to other mobile units that use Bluetooth communication, such as cell phones and personal digital assistants (PDA's).

Each Bluetooth device can be associated with only one master device. Once a Bluetooth device enters a piconet 14, the fixed master device 12 will associate with it in order to manage communication amongst all devices within that piconet. When a device leaves a piconet and enters another piconet it will fail to communicate with the first fixed device 12 due to a low signal. The device is than dropped from association with the first fixed master device 12 and becomes associated with a different master device 12. The masters 12 of each piconet 14 may also negotiate directly to process the hand off between master devices. The hand off process may also be reported to the network host 32 so that the trajectory of the Bluetooth device may be predicted ahead of time, as this feature may be useful for certain applications.

Referring to FIG. 2 there is show a block diagram of the fixed device 12 which may be used in connection with the system shown in FIG. 1. The device 12 includes an RF module 34 having an antenna 36 for transmitting and receiving Bluetooth radio signals. A Bluetooth radio interface 42 couples the transmitter/receiver to a Bluetooth baseband modem 46 of conventional design. Fixed device 12 additionally has an RFID transmitter/receiver 38 having an antenna 40 which is coupled by radio interface 44 to an RFID baseband modem 48. RF baseband modems 46 and 48 are connected to a bit stream processor 50 which arranges the received bit streams into a common format which is loaded into FIFO register 54. Register File 52 stores parameters, flags and status for the modulation and demodulation process.

According to one approach, the RFID data stream received as a response to an RFID transmitted reading signal is formatted into the format used for a Bluetooth communication, and loaded into FIFO register 54 to be supplied by interface 56 to a host interface processor 60. Processor 60 includes a microprocessor 62 and interface 68, a working memory 70, timers 64, and optionally a host interface 66. Programming may be provided on a flash memory 72. Host interface processor 60 may be programmed to perform processing on both the Bluetooth data streams and processing on the RFID received signals, to determine the identity and location of a responding RFID tag.

The Bluetooth and RFID functionality is efficiently and effectively combined by using a single based band processor and single host interface processor. Only the front end transmitter/receiver of the two radios need to be different. Both the Bluetooth and RFID radio front ends will produce an analog I/Q (quadrature) signal to the baseband processor for digitization and bit reconstruction. Each involves similar clock, bit recovery, frame striping, and error correction functions. Therefore the baseband processor may be of reconfigurable design in order to optimally process RFID or Bluetooth signals during the appropriate time intervals. Transmitter/receivers 34, 38 need not operate simultaneously. Since the Bluetooth master is the Bluetooth network controller, the host processor 60 can place presently active Bluetooth devices into hold, park or stand-by modes during a time period during which it processes RFID tags. That is, the host processor can allocate fixed time slots for RFID readings and Bluetooth operation within the piconet.

The radio architecture shown in FIG. 2 is flexible and provides a single common industry standard interface to host application drivers. That is the baseband processor may transfer all data from the incoming frames into standard Bluetooth or selected standard RFID data frames. This allows for a single standard interface between the baseband processor 58 and the host interface processor 60. Therefore any commercial single chip host interface processor, developed for Bluetooth applications, for example, can be utilized to process data from RFID tags as well, and vice versa.

Figure 3:
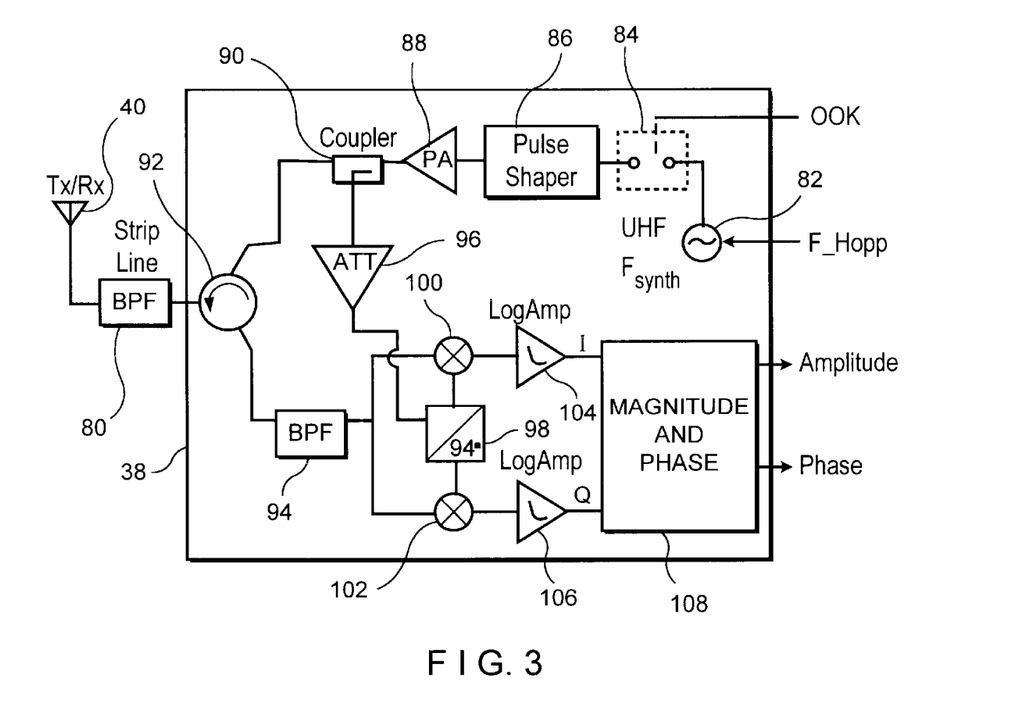
FIG. 3 is a block diagram of an RFID transmitter/receiver useful in connection with the device of FIG. 2.

FIG. 3 shows an RFID reader radio front end which may be used in connection with the device 12. The RF front end includes an oscillator 82 which is responsive to a frequency hop signal supplied to it. A transmission switch 84 couples the oscillator signal to a pulse shaper 86, power amplifier 88 and to circulator 92 via coupler 90. A strip line band pass filter 80 connects circulator 92 to antenna 40. Coupler 90 provides a portion of the transmitted signal to be used for synchronous detection in the receiver. Circulator 92 provides a received signal, which is reflected from an RFID tag with varying intensity corresponding to the bit stream it is transmitting, through band pass filter 94 to mixers 100 and 102, which receive portions of the transmitted signal which are provided in phase quadrature by splitter 98, simultaneous with the received signal. The output of mixers 100, 102, representing the in-phase and quadrature-phase baseband signals, are provided through amplifiers 104, 106 to magnitude and phase circuit 108. The outputs of circuit 108 are signals representing the amplitude and phase of the back scatter signal from the RFID tag.

The phase of the recovered signal can be determined with respect to the phase of the transmitted signal. The phase difference may be translated into time differences at each transmitted frequency in order to determine the distance from device 12 to the reflecting RFID tag. The phase difference is unique to each transmitting frequency. Therefore several transmitting frequencies, in addition to the received signal strength, may be utilized in order to determine the absolute distance from device 12 to the tag with high resolution.

Figure 7:
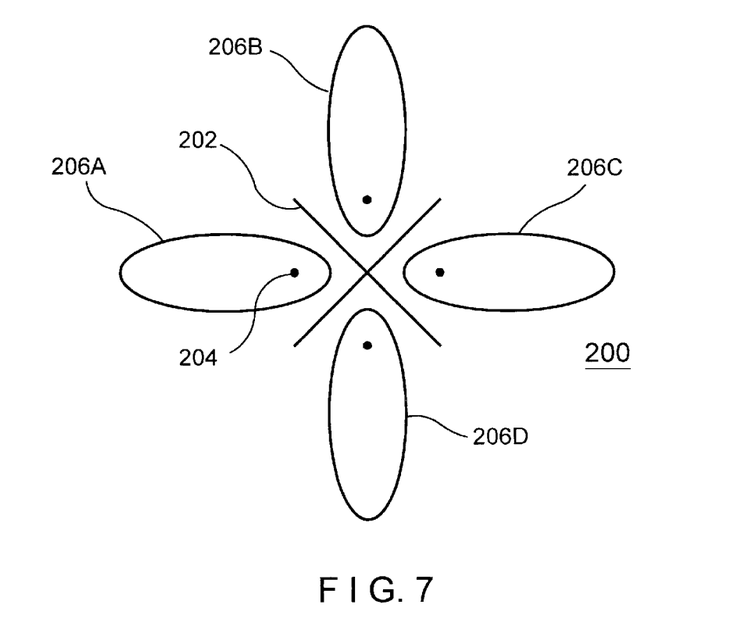
FIG. 7 is a diagram illustrating an antenna for a fixed device having directional antenna beams.

In one embodiment, shown in FIG. 7, device 12 is designed to transmit directional radiation patterns to limit the RFID tag exposure within a narrow cone angle. Referring to FIG. 7 there is disclosed a directional antenna which includes a crossed corner reflector 202 and monopole or dipole radiators 204 for radiating four directional antenna beams 206A, 206B, 206C and 206D in four quadrant from a fixed device 12. If the antenna shown in FIG. 7 is used for purposes of reading RFID devices, a device in one of the four quadrants will respond only when the transmission and reception is on the antenna beam 206 corresponding to that quadrant. Alternatively a single beam antenna may be used, which may have a changing beam direction either through electronic or mechanical steering of the antenna. By adding a combination of antenna directivity and determination of RFID range, the radial and angular position of an RFID tag from the device 12 can be determined.

Figure 4:
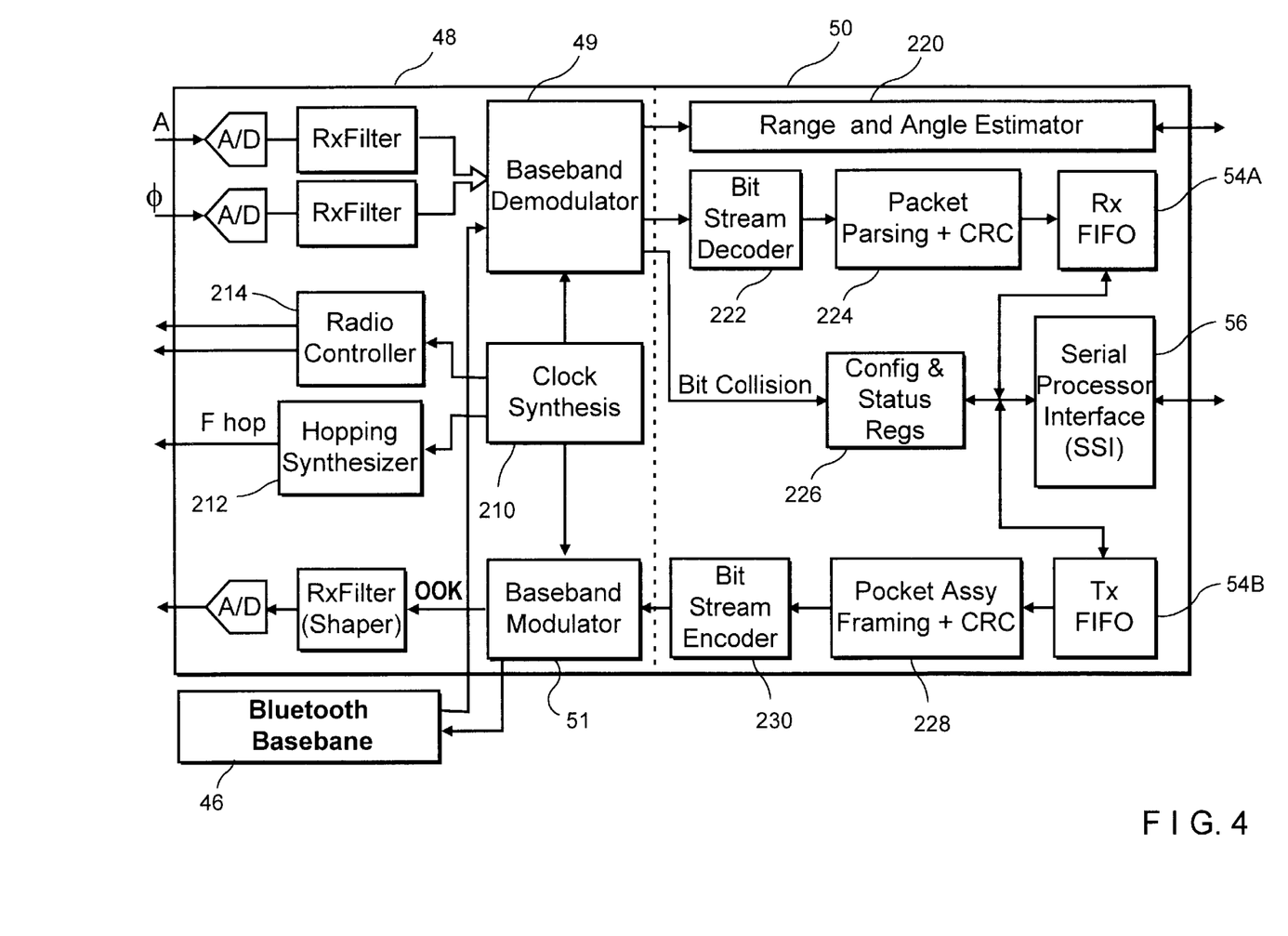
FIG. 4 is a block diagram showing a radio interface and baseband modem useful in connection with the FIG. 2 device.

Referring to FIG. 4 there are shown further details of a baseband modem portion and the bit stream processor which may be used in connection with device 12. RF signals received in the radio stage and are demodulated to baseband and provided to modem sections 46, 48 which include a baseband demodulator 49 and a baseband modulator 51. Additional filter and A–D converter elements are also provided. This section further includes a clock synthesizer 210, a radio controller 214 and a frequency hop synthesizer 212. These elements are used to control the RF modules of the device. The bit stream processor includes a range and angle estimator 220 which responds to the amplitude and phase of the RFID signals from baseband demodulator 49. Both RFID response signals and the Bluetooth signals from baseband circuit 46 are provided to a configurable bit stream decoder 222, packet passing circuit 225, and FIFO register 54A in connection with receiver operations. In connection with transmit operations, the serial processor interface 56 provides the bit streams to FIFO register 54B and thereafter to packet assembly and bit stream encoders 228 and 230. Modulator 51 provides signals to be transmitted respectively to the RFID or Bluetooth transmission circuits. A configuration and status register 226 controls the sequencing of the bit stream processor. The bit stream processor may, for example, be implemented as a programmable logic array, and may be configurable according to the type of signal being used, such as a selected version of an RFID signal, or a Bluetooth signal, for example. Preferably bit stream processor 50 configures the received packets in FIFO memory 54A in one of the two formats, so that it may be provided to the host interface processor 66 in a uniform format, independent of the type of signal received. Likewise signals to be transmitted are provided in a fixed format to the transmit register 54B.

Figure 5:
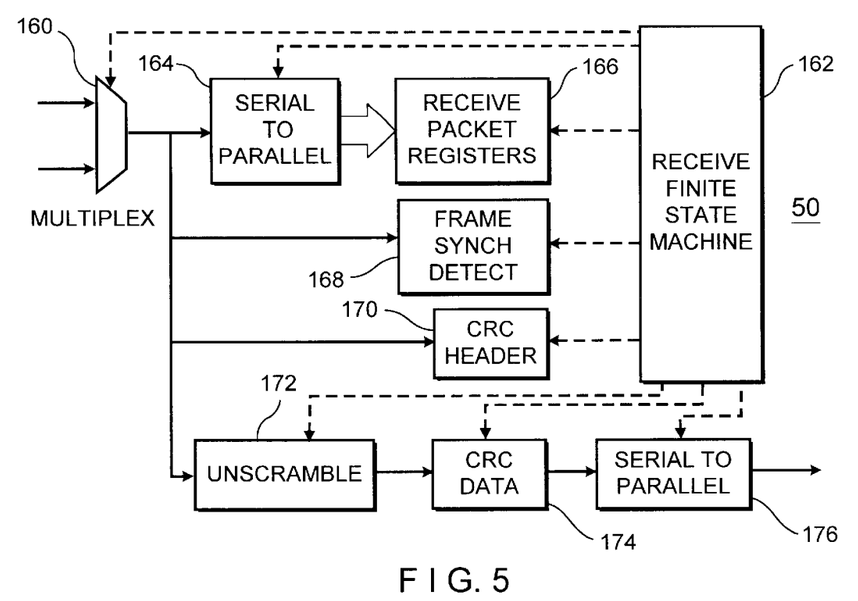
FIG. 5 is a block diagram showing the functional arrangement of the bit stream processor of the FIG. 2 device in connection with receive operation.

Configurable bit-stream processor 50, which may be implemented in a programmed field programmable logic array is arranged to process the serial bit streams for both the Bluetooth and RFID communications. One logic configuration for receiving signals is shown in FIG. 5, wherein there is provided a multiplexer 160 for connection to the RFID and Bluetooth modem receive channels. The receive operation is controlled by a finite state machine 162 which controls the logic elements according to the communication format, and likewise controls multiplexer 160, as indicated by dotted lines. Serial to parallel converter 164 receives the header data and converts it to parallel data which is stored in registers 166, where is can be accessed by state machine 162. The received bit stream is likewise provided to a frame synchronization detector 168 and received CRC data is provided to CRC register 170, which are likewise accessed by state machine 162. The data stream is additionally provided to unscrambler 172, CRC module 174, which performs the CRC check against the received CRC header and serial to parallel converter 176 which provides the received data to FIFO storage 54A.

Figure 6:
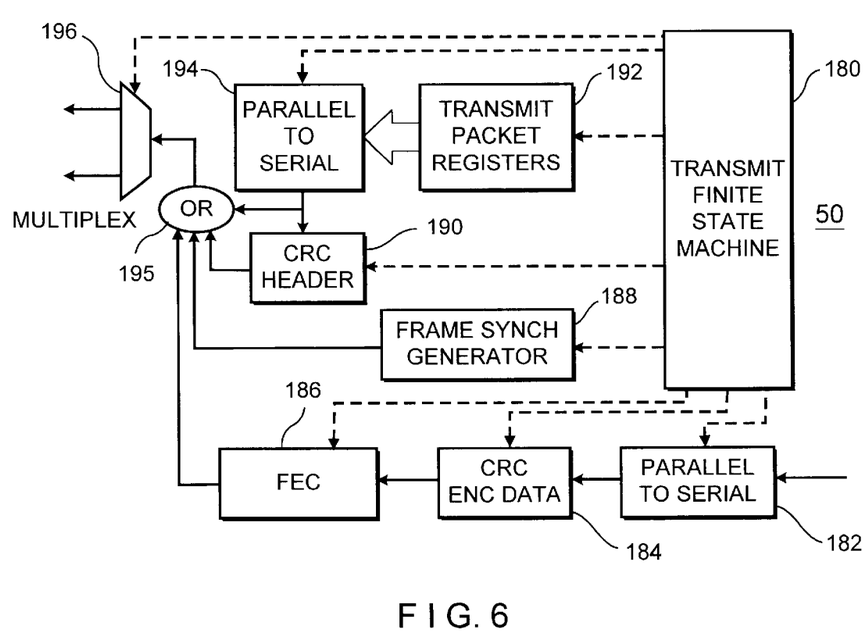
FIG. 6 is a block diagram showing the functional operation of the bit stream processor of the FIG. 2 device for transmit operations.

FIG. 6 shows the logic operation of an example of configurable bitstream processor for operation in the transmit mode. Finite state machine 180 is configured to generate the frame header, which is provided to register 192 and converted to serial form in parallel to serial converter 194. Frame sync is generated in generator 188 and CRC is computed and provided to CRC header register 190. Data to be transmitted is read from FIFO 44 by parallel to serial converter 182, and CRC is computed in CRC logic 184. Forward error correction is generated in logic 186. State machine 180 controls the logic units to provide the entire transmit packet in appropriate order to OR gate 195 and the packet is routed as the complete bit stream in the appropriate format to the transmit circuits of either the RFID modem 48 or the Bluetooth modem 46 by multiplexer 196.

While there has been described what is believe to be the preferred embodiment of the present invention, those skilled in the art will recognize that other and further changes and modifications may be made thereto without departing from the spirit of the invention and it is intended to claim all such changes and modifications as fall within the true scope of the invention.

What is claimed is:

1. A method for locating items, comprising:
   providing a plurality of distributed fixed devices;
   operating each said fixed device as a master unit using a first wireless data communications protocol, each said master unit controlling slave units within at least one area corresponding to the location of each said fixed device, said operating including identifying said slave units thereby to locate items corresponding to said slave units within said area; and
   operating each said fixed device as an RFID reader using a second RFID protocol different from said first protocol to identify items having RFID tags with said area.

2. A method as specified in claim 1, further comprising providing items with slave units using said wireless data protocol and RFID tags.

3. A method as specified in claim 1, wherein said fixed device is operated as a master unit and as an RFID reader during alternating time periods.

4. A method as specified in claim 1, wherein said plurality of fixed devices are distributed at intervals corresponding to twice the range of said devices operating as RFID readers.

5. A method as specified in claim 1, wherein said operation to identify and locate items having RFID tags comprises transmitting RFID reader signals, receiving RFID response signals and determining the range of an RFID device from said fixed device using said response signals.

6. A method as specified in claim 5, wherein said range is determined from the phase of said response signals.

7. A method as specified in claim 6, wherein said phase is determined at a plurality of frequencies.

8. A method as specified in claim 1, wherein operating said device as an RFID reader includes transmitting and receiving RFID signals on a directional antenna beam to thereby determine the direction of an RFID device with respect to a fixed device.

9. A system for locating items comprising a plurality of fixed devices distributed over an area and subdividing said area into a plurality of cells, each fixed device corresponding to one or more of said cells, said fixed devices each comprising a transmitter, a receiver and a signal processor, each said fixed devices being arranged to operate as a master unit using a first wireless data communications protocol to communicate with slave units in said one or more cells corresponding to said fixed device to thereby locate items having said slave devices in said one or more cells, and said fixed devices being arranged to operate as RFID tag readers using a second RFID protocol different from said first protocol to identify and locate RFID tags on items in said one or more cells.

10. A system as specified in claim 9, wherein said fixed devices are arranged to communicate location data relating to said items having slave units and said items having RFID tags to a host processor.

11. A device comprising:
    at least one transmitter;
    at least one receiver;
    and a processor coupled to provide signals for transmission by said transmitter and coupled to process signals received by said receiver; said processor including a first program for sending and receiving digital data signals using a first wireless data communication protocol and thereby identifying remote units within range for communication therewith and a second program for sending and receiving RFID reading signals using a second RFID protocol different from said first protocol to thereby identify RFID tags within range for identification.

12. A device as specified in claim 11, wherein said second program further provides for determining range from said device to said RFID tags.

13. A device as specified in claim 11, wherein said device includes two transmitters and two receivers for respectively transmitting and receiving wireless data communications signals and RFID signals.

14. A device as specified in claim 13, wherein said two transmitters and two receivers are coupled to said processor by a common baseband signal processor.

15. A device a specified in claim 11, wherein said processor is arranged to cause said device to operate using said first and second program during alternating time intervals.

16. A device as specified in claim 11, wherein said processor is further programmed to provide data identifying said remote units within range and data identifying said RFID tags to a host processor.

* * * * *

UNITED STATES PATENT AND TRADEMARK OFFICE
CERTIFICATE OF CORRECTION

PATENT NO. : 6,717,516 B2
DATED : April 6, 2004
INVENTOR(S) : Bridgelall

It is certified that error appears in the above-identified patent and that said Letters Patent is hereby corrected as shown below:

Column 5,
Line 1, "show" should read -- shown --

Column 8,
Line 58, "baseband signal" should read -- bit stream --

Signed and Sealed this

Fifteenth Day of February, 2005

JON W. DUDAS
*Director of the United States Patent and Trademark Office*